(12) United States Patent
Narutomi et al.

(10) Patent No.: US 10,522,835 B2
(45) Date of Patent: Dec. 31, 2019

(54) BINDER COMPOSITION FOR POSITIVE ELECTRODES, SLURRY FOR POSITIVE ELECTRODES, POSITIVE ELECTRODE AND LITHIUM ION SECONDARY BATTERY

(71) Applicant: Denka Company Limited, Tokyo (JP)

(72) Inventors: Takuya Narutomi, Tokyo (JP); Jun Watanabe, Tokyo (JP); Shigeru Suzuki, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 15/774,541

(22) PCT Filed: Aug. 26, 2016

(86) PCT No.: PCT/JP2016/074911
§ 371 (c)(1),
(2) Date: May 8, 2018

(87) PCT Pub. No.: WO2017/104178
PCT Pub. Date: Jun. 22, 2017

(65) Prior Publication Data
US 2018/0358624 A1 Dec. 13, 2018

(30) Foreign Application Priority Data

Dec. 15, 2015 (JP) .................. 2015-243812

(51) Int. Cl.
| | |
|---|---|
| *H01M 4/13* | (2010.01) |
| *H01M 4/62* | (2006.01) |
| *C08F 261/04* | (2006.01) |
| *H01M 4/131* | (2010.01) |
| *H01M 4/505* | (2010.01) |
| *H01M 4/525* | (2010.01) |
| *C08K 3/04* | (2006.01) |
| *H01M 10/0525* | (2010.01) |
| *H01M 4/66* | (2006.01) |
| *H01M 4/02* | (2006.01) |

(52) U.S. Cl.
CPC .......... *H01M 4/622* (2013.01); *C08F 261/04* (2013.01); *C08K 3/04* (2013.01); *H01M 4/131* (2013.01); *H01M 4/505* (2013.01); *H01M 4/525* (2013.01); *H01M 4/625* (2013.01); *H01M 10/0525* (2013.01); *C08K 2201/001* (2013.01); *H01M 4/661* (2013.01); *H01M 2004/028* (2013.01)

(58) Field of Classification Search
CPC ........ H01M 4/622; H01M 4/13; H01M 4/131; H01M 4/505; H01M 4/525; H01M 4/62; H01M 4/625; H01M 4/4661; H01M 10/052; H01M 10/0525; H01M 2004/028
See application file for complete search history.

(56) References Cited

U.S. PATENT DOCUMENTS

| | | | |
|---|---|---|---|
| 5,415,958 A | 5/1995 | Takahashi et al. | ........... 429/217 |
| 9,941,518 B2 * | 4/2018 | Sakurai | .......... C08F 261/04 |
| 2016/0240854 A1 | 8/2016 | Sakurai et al. | |

FOREIGN PATENT DOCUMENTS

| | | |
|---|---|---|
| JP | H 6-172452 A | 6/1994 |
| JP | WO 2009/114004 A1 | 9/2009 |
| JP | 2013-84351 A | 5/2013 |
| JP | 2013-98123 A | 5/2013 |
| WO | WO 2015/053224 A1 | 5/2015 |

OTHER PUBLICATIONS

International Search Report dated Nov. 1, 2016, issued by the Japanese Patent Office in corresponding application PCT/JP2016/074911.

* cited by examiner

*Primary Examiner* — Jane J Rhee
(74) *Attorney, Agent, or Firm* — Stein IP, LLC

(57) ABSTRACT

A binder composition for positive electrode with superior oxidation resistance is provided. A slurry for positive electrode, a positive electrode, and a lithium ion secondary battery manufactured by using the binder composition is provided. A binder composition for positive electrode including a graft copolymer in which a monomer containing acrylonitrile as a main component is graft copolymerized with polyvinyl alcohol having an average degree of polymerization of 300 to 3000 and a saponification degree of 70 to 100 mol %, is provided. Further, a slurry for positive electrode includes the binder composition for positive electrode, a positive electrode active material, and a conductive assistant. In addition, a lithium ion secondary battery is manufactured using a positive electrode made with the slurry for positive electrode and a positive electrode.

9 Claims, No Drawings

BINDER COMPOSITION FOR POSITIVE ELECTRODES, SLURRY FOR POSITIVE ELECTRODES, POSITIVE ELECTRODE AND LITHIUM ION SECONDARY BATTERY

CROSS-REFERENCE TO RELATED APPLICATIONS

This application is a national stage application of International Application No. PCT/JP2016/074911, filed Aug. 26, 2016, which claims the benefit of priority to Japanese Application No. 2015-243812, filed Dec. 15, 2015, in the Japanese Patent Office, the disclosures of which are incorporated herein in their entireties by reference.

TECHNICAL FIELD

The present invention relates to a binder composition for positive electrode, a slurry for positive electrode slurry for positive electrode, a positive electrode, and a lithium ion secondary battery.

BACKGROUND

The present invention relates to a binder composition for positive electrode, a slurry for positive electrode using the binder composition, and to a positive electrode and a lithium ion secondary battery using the slurry for positive electrode.

In recent years, secondary batteries have been used as power sources for electronic devices such as laptop computers and cellular phones, and development of hybrid vehicles and electric vehicles using a secondary battery as a power source for the purpose of reducing the environmental load has been promoted. A secondary battery having high energy density, high voltage and high durability is required for these power sources. Lithium-ion secondary battery is attracting attention as a secondary battery capable of achieving high voltage and high energy density.

Lithium ion secondary battery includes a positive electrode, a negative electrode, an electrolyte, and a separator, and the positive electrode includes a positive electrode active material, a conductive assistant, a metal foil, and a binder. As the binder, a fluorine-based resin such as polyvinylidene fluoride and polytetrafluoroethylene, a styrene-butadiene copolymer, and an acrylic copolymer are used (for example, refer to Patent Documents 1 to 3).

However, in general, there had been cases where the conventional binder showed poor binding property with the metal foil. In addition, in order to increase the voltage and the energy of the lithium ion secondary battery, a positive electrode active material having a high potential is required. Usually, the conventional binder have poor oxidation resistance, and thus when charge and discharge were repeated, the binder was decomposed and the positive electrode active material would fall off from the metal foil, thereby resulting in decrease in the battery capacity.

In order to solve these problems, Patent Document 4 discloses a binder composition for positive electrode in which polyacrylonitrile is graft-copolymerized with polyvinyl alcohol, and when this positive electrode binder is used, lithium ion secondary showed improved durability and oxidation resistance. However, in the current market, a lithium ion secondary battery with even higher durability is desired when used in combination with a high potential positive electrode active material, and thus a positive electrode binder that satisfies this requirement is necessary.

CITATION LIST

Patent Literature

Patent Literature 1: JP 2013-98123 A
Patent Literature 2: JP 2013-84351 A
Patent Literature 3: JP H6-172452 A
Patent Literature 4: WO 2015/05322

SUMMARY OF THE INVENTION

Problems to be Solved by the Invention

In view of the above problems, an object of the present invention is to provide a binder having superior oxidation resistance. Another object of the present invention is to provide a slurry for positive electrode manufactured using the binder, a positive electrode, and a lithium ion secondary battery in which an amount of metal elution from the positive electrode is highly suppressed.

Means to Solve the Problem

The present inventors have conducted diligent efforts to achieve the afore-mentioned object, and found that a polymer obtained by graft copolymerizing a monomer containing acrylonitrile as a main component with polyvinyl alcohol can serve as a binder having high oxidation resistance.

That is, the present invention provides a binder composition for positive electrode as described below.

Accordingly, the present invention provides a binder composition for positive electrode described below.

(1) A binder composition for positive electrode comprising a graft copolymer obtained by graft copolymerizing, with polyvinyl alcohol, a monomer containing acrylonitrile as a main component; wherein: the polyvinyl alcohol has an average degree of polymerization of 300 to 3000; the polyvinyl alcohol has a saponification degree of 90 to 100 mol %; the graft copolymer has a polyvinyl alcohol amount of 10 to 40 mass %; and the graft copolymer has a polyacrylonitrile amount of 90 to 60 mass %.

(2) The binder composition for positive electrode of (1), wherein: the graft copolymer has a graft rate of 150 to 900%; and a homopolymer of polyacrylonitrile generated during the graft copolymerization has a mass average molecular weight of 30000 to 250000.

(3) A slurry for positive electrode; comprising: the binder composition for positive electrode of (1) or (2); a positive electrode active material; and a conductive assistant.

(4) The slurry for positive electrode of (3); wherein a solid content of the binder composition for positive electrode with respect to a total solids of the slurry for positive electrode is 1 to 20 mass %.

(5) The slurry for positive electrode of (3) or (4); wherein the positive electrode active material comprises at least one selected from the group consisting of: $LiNi_xMn_{(2-x)}O_4$ (wherein $0<X<2$) and $Li(Co_xNi_yMn_z)O_2$ (wherein $0<X<1$, $0<Y<1$, $0<Z<1$, and $X+Y+Z=1$).

(6) The slurry for positive electrode of any one of (3) to (5); wherein the conductive assistant comprises at least one selected from the group consisting of: (i) fibrous carbon, (ii) carbon black, and (iii) carbon composite in which fibrous carbon and carbon black are linked to each other.

(7) A positive electrode, comprising: a metal foil; and a coating comprising the binder composition for positive electrode of (1) or (2); a positive electrode active material; and a conductive assistant; the coating being formed on the metal foil.
(8) A lithium ion secondary battery comprising the positive electrode of (7).
(9) The lithium ion secondary battery of (8), wherein both of an elution amount of Mn and Ni from the positive electrode active material to a negative electrode when the battery was fully charged and then stored at 60° C. for 96 hours are 100 ppm or less.

Effect of the Invention

According to the present invention, a binder composition for positive electrode having superior oxidation resistance can be provided. In addition, the present invention can provide, by using this binder composition for positive electrode, a battery with superior cycle characteristics using a high potential positive electrode active material.

Here, high potential positive electrode active material in the present invention means an active material which shows a positive electrode voltage of 4.5V or more during charging observed in a charging and discharging curve of the positive electrode of the lithium ion secondary battery.

MODE FOR CARRYING OUT THE INVENTION

Hereinafter, the embodiments for carrying out the present invention will be described in detail. Here, the present invention shall not be limited to the embodiments described below.

<Binder Composition for Positive Electrode>

The binder composition for positive electrode according to the embodiment of the present invention (hereinafter may be referred to as "binder composition") includes a graft copolymer obtained by graft copolymerizing, with polyvinyl alcohol (hereinafter may be abbreviated as PVA), a monomer containing acrylonitrile as a main component. This graft copolymer is a copolymer in which side chains of polyacrylonitrile (hereinafter may be abbreviated as PAN) are formed from the main chain of polyvinyl alcohol. In addition to the graft copolymer, a PAN homopolymer and/or a PVA homopolymer not involved in the graft copolymerization may be present in the binder composition. Therefore, the binder composition of the present embodiment may contain a PAN homopolymer and/or a PVA homopolymer in addition to the graft copolymer as the resin component (polymer component).

The monomers to be grafted with PVA have acrylonitrile as an essential component from the viewpont of oxidation resistance. As monomers to be grafted with PVA, in addition to acrylonitrile, ethylenically unsaturated carboxylic acid esters such as methyl methacrylate, methyl acrylate, ethyl acrylate, butyl acrylate, 2-ethylhexyl methacrylate and 2-ethylhexyl acrylate; ethylenically unsaturated carboxylic acids such as (meth)acrylic acid, maleic anhydride and itaconic acid; and styrene can be used in combination to an extent so long as the oxidation resistance of the binder would not be degraded. These monomers may be used alone, or two or more of these monomers may be used in combination. Of these, ethylenically unsaturated carboxylic acid esters are preferable, acrylic acid esters and/or methacrylic acid esters are more preferable, and methyl methacrylate is further more preferable. The monomer to be grafted with PVA is more preferably composed of acrylonitrile alone, and further more preferably composed of acrylonitrile and methyl methacrylate.

The main component of the monomer grafted with PVA is acrylonitrile, and the content thereof is preferably 50 mass % or more, more preferably 90 mass % or more, of the graft copolymerized monomer. When acrylonitrile is 90 mass % or more of the graft copolymerized monomer, there is a possibility to enhance the oxidation resistance of the binder composition. The composition of the monomer which have been graft copolymerized with PVA can be determined by $^1$H-NMR (proton nuclear magnetic resonance spectroscopy).

The saponification degree of PVA is 90 to 100 mol % from the viewpoint of oxidation resistance, and is preferably 95 mol % or more from the viewpoint of enhancing the coatability to the active material. The saponification degree of PVA mentioned here is a value measured by a method in accordance with JIS K 6726.

The average degree of polymerization of PVA is 300 to 3000 from the viewpoints of solubility, binding property and viscosity of the binder. The average degree of polymerization of PVA is preferably 320 to 2950, more preferably 500 to 2500, and even more preferably 500 to 1800. When the average degree of polymerization of PVA is less than 300, the binding property between the binder with the active material and with the conductive assistant decreases and the durability may decrease in some cases. In addition, when the average degree of polymerization of PVA exceeds 3000, solubility decreases and viscosity increases, making it difficult to produce the slurry for positive electrode. The average degree of polymerization of PVA mentioned here is a value measured by a method in accordance with JIS K 6726.

The graft rate of the graft copolymer is preferably 150 to 900%, more preferably 200 to 900%, further more preferably 300 to 900%, and even more preferably 300 to 570%. When the graft rate is less than 150%, oxidation resistance may decrease. In addition, when the graft rate exceeds 900%, the adhesive property may decrease.

Since there are cases where a PAN homopolymer is formed when the graft copolymer is formed (during graft copolymerization), it is necessary to separate the PAN homopolymer from the graft copolymer in order to calculate the graft rate. The PAN homopolymer can be dissolved in dimethylformamide (hereinafter may be abbreviated as DMF), however, PVA and graft copolymerized PAN do not dissolve in DMF. By utilizing this difference in solubility, PAN homopolymer can be separated by an operation such as centrifugal separation.

Specifically, a graft copolymer with a known PAN content is immersed in a predetermined amount of DMF to allow elution of the PAN homopolymer into DMF. Subsequently, the liquid into which the graft copolymer was immersed is separated into DMF soluble matter and DMF insoluble matter by centrifugation.

Here, when a, b, and c are defined as follows:
a: amount of graft copolymer used for the measurement
b: mass % of PAN in graft copolymer used for the measurement
c: amount of insoluble matter in DMF The graft rate can be calculated from the following formula (1).

$$\text{graft rate}=[c-a\times(100-b)\times0.01]/[a\times(100-b)\times0.01]\times100(\%) \quad (1)$$

The graft rate of the graft copolymer obtained from the above formula (1) is preferably 150 to 900% from the viewpoint of enhancing the ability to coat the active material.

The binder composition of the present invention may contain, besides the graft copolymer, a PAN homopolymer and a PVA homopolymer, which may be generated during the production of the graft copolymer. Here, the PAN homopolymer preferably have a mass average molecular weight of 30000 to 250000, and more preferably 80000 to 150000. In order to suppress the viscosity increase of the PAN homopolymer to allow easy manufacture of the slurry for positive electrode, the mass average molecular weight of the PAN homopolymer is preferably 250000 or less, more preferably 200000 or less, and further preferably 150000 or less. Here, the mass average molecular weight of the PAN homopolymer can be obtained by GPC (gel permeation chromatography).

The amount of PVA in the graft copolymer is 10 to 40 mass %, preferably 10 to 38 mass %, more preferably 10 to 35 mass %, more preferably 10 to 30 mass %, more preferably 10 to 25 mass %, and more preferably 10 to 20 mass %. When the amount of PVA is less than 10 mass %, the binding property may be degraded. In addition, when the amount of PVA exceeds 40 mass %, the oxidation resistance may be degraded.

Here, in the present invention, the amount of PVA in the graft copolymer is defined as a mass ratio of the amount of PVA in the graft copolymer and the amount of PVA homopolymer per the sum of the graft copolymer, PAN homopolymer, and PVA homopolymer.

The amount of PAN in the graft copolymer is 90 to 60 mass %, preferably 90 to 62 mass %, more preferably 90 to 65 mass %, more preferably 90 to 30 mass %, more preferably 90 to 75 mass %, and more preferably 90 to 80 mass %. When the amount of PAN exceeds 90 mass %, the binding property may be degraded. In addition, when the amount of PAN is less than 60 mass %, the oxidation resistance may be degraded.

Further, when the amount of PAN exceeds 60 mass %, although precise reason is not clear, decrease in the amount of Mn, Ni eluting from the positive electrode active material of the lithium ion secondary battery was observed.

Here, in the present invention, the amount of PAN in the graft copolymer is defined as a mass ratio of the amount of PAN graft copolymerized and the amount of PAN homopolymer per the sum of the graft copolymer, PAN homopolymer, and PVA homopolymer.

The composition ratio of the graft copolymer (composition ratio of resin component in binder composition) can be calculated from the reaction rate (polymerization rate) of acrylonitrile and the composition of the amount stocked for each component used in the polymerization.

The mass proportion of PAN generated during copolymerization, that is, the proportion of the sum of PAN and PAN homopolymer grafted with PVA can be calculated from the polymerization rate of acrylonitrile and the mass of acrylonitrile stocked. Further, by taking the ratio of the mass of PAN to the mass of stocked PVA, the mass ratio of PVA to PAN can be calculated.

Specifically, the mass % of PAN in the graft copolymer can be obtained from the following formula (2).

$$\text{mass \% of PAN in graft copolymer} = d \times 0.01 \times e/(f + d \times 0.01 \times e) \times 100(\%) \quad (2)$$

Here, in formula (2), d is the polymerization rate (%) of acrylonitrile, e is the mass amount of acrylonitrile used for graft copolymerization (amount stocked), and f is the mass amount of PVA used for graft copolymerization (amount stocked).

The composition ratio of the graft copolymer (composition ratio of the resin component in the binder composition) can also be determined by $^1$H-NMR. For example, when a monomer other than acrylonitrile is used in graft copolymerization in addition to acrylonitrile, it becomes difficult to calculate the composition ratio using the above formula (2), and therefore the composition ratio can be determined by $^1$H-NMR. The measurement by $^1$H-NMR can be carried out under the following conditions; measurement solvent: dimethyl sulfoxide, measurement cell: 5 mmφ, sample concentration: 50 mg/1 ml, measurement temperature: 30° C., using the device available under the trade name of "ALPHA 500" (manufactured by JEOL Ltd.).

The method for manufacturing the binder composition of the present embodiment is not particularly limited, and it is preferable that polyvinyl acetate is polymerized and saponified to obtain PVA, and then a monomer containing acrylonitrile as a main component is graft copolymerized with PVA.

As a method of polymerizing polyvinyl acetate, any known method such as bulk polymerization, solution polymerization and the like can be used.

Examples of the initiator used for polymerization of polyvinyl acetate include azo initiators such as azobisisobutyronitrile and organic peroxides such as benzoyl peroxide and bis (4-t-butylcyclohexyl) peroxydicarbonate and the like.

The saponification reaction of polyvinyl acetate can be carried out, for example, by saponification in an organic solvent in the presence of a saponification catalyst.

Examples of the organic solvent include methanol, ethanol, propanol, ethylene glycol, methyl acetate, ethyl acetate, acetone, methyl ethyl ketone, benzene, toluene and the like. These organic solvents may be used alone or in combination of two or more. Among these, methanol is preferred.

Examples of the saponification catalyst include basic catalysts such as sodium hydroxide, potassium hydroxide and sodium alkoxide, and acidic catalysts such as sulfuric acid and hydrochloric acid. Among these, sodium hydroxide is preferable from the viewpoint of the saponification velocity.

The method of graft copolymerizing a monomer containing acrylonitrile as a main component with polyvinyl alcohol can be carried out by solution polymerization. Examples of the solvent used include dimethylsulfoxide, N-methylpyrrolidone and the like.

Examples of the initiator used for graft polymerization include organic peroxides such as benzoyl peroxide, azo compounds such as azobisisobutyronitrile, potassium peroxodisulfate, ammonium peroxodisulfate and the like.

The binder composition of the present embodiment can be dissolved in a solvent for usage. Examples of the solvent include dimethylsulfoxide, N-methylpyrrolidone and the like. The binder composition preferably includes these solvents, and one or two or more of these solvents may be included.

Since the binder composition of the present embodiment described in detail above contains the afore-mentioned graft copolymer, binding property with respect to the positive electrode active material and the metal foil are superior. Further, the binder composition covers the active material.

Therefore, with the slurry for positive electrode including this binder composition, a lithium ion secondary battery using a high potential positive electrode active material which can achieve superior cycle characteristics, rate characteristics, and ability to suppress decrease in OCV (storage characteristic) during high temperature storage, as well as an electrode (positive electrode) for obtaining such lithium ion secondary battery, can be obtained. Therefore, the binder composition of the present embodiment is more suitable for the lithium ion secondary battery.

<Slurry for Positive Electrode>

The slurry for positive electrode according to the present invention comprises the afore-mentioned binder composition for positive electrode; a positive electrode active material; and a conductive assistant.

(Positive Electrode Active Material)

As the positive electrode active material used for the positive electrode, there is no particular limitation. Here, at least one selected from the group consisting of a composite oxide composed of lithium and transition metal (lithium transition metal complex oxide), and a phosphate of lithium and transition metal (lithium transition metal phosphate) is preferable. More specifically, it is preferable to use lithium transition metal complex oxides such as $LiCoO_2$, $LiNiO_2$, $Li(Co_XNi_YMn_Z)O_2$ ($0<X<1$, $0<Y<1$, $0<Z<1$ and $X+Y+Z=1$), $Li(Ni_XAl_YCo_Z)O_2$ ($0<X<1$, $0<Y<1$, $0<Z<1$ and $X+Y+Z=1$), $0<X<1$, $LiMn_2O_4$, and $LiNi_XMn_{(2-X)}O_4$ ($0<X<2$), one or two or more of these in combination as the positive electrode active material. Among these positive electrode active materials, at least one of the high potential active material selected from $LiNi_XMn_{(2-X)}O_4$ ($0<X<2$) and $Li(Co_XNi_YMn_Z)O_2$ ($0<X<1$, $0<Y<1$, $0<Z<1$, and $X+Y+Z=1$) which show a positive electrode voltage of 4.5V or higher during charging in the charging and discharging curves of the positive electrode of the lithium ion secondary battery is preferable.

(Conductive Assistant)

The slurry for positive electrode of the present embodiment can contain a conductive assistant. As the conductive assistant, it is preferable to use at least one selected from the group consisting of (i) fibrous carbon, (ii) carbon black, and (iii) carbon composite in which fibrous carbon and carbon black are linked to each other. As the fibrous carbon, vapor grown carbon fiber, carbon nanotube, carbon nanofiber and the like can be mentioned. Examples of the carbon black include acetylene black, furnace black, Ketjen black (registered trademark), and the like can be mentioned. These conductive assistants can be used alone, or two or more of the conductive assistants can be used in combination. Among these, one or two or more conductive assistants selected from the group consisting of acetylene black, carbon nanotube, and carbon nanofiber are preferable.

The slurry for positive electrode of the present embodiment can contain, in order to improve the conductivity imparting ability of the conductive assistant and the active material and improve conductivity of a carbon composite in which a plurality of kinds of conductive assistants and active materials are linked to each other. For example, in the case of a slurry for an electrode of lithium ion secondary battery, a carbon composite in which fibrous carbon and carbon black are linked to each other, and a composite in which a carbon-coated positive electrode active material is combined with fibrous carbon and carbon black can be mentioned. The carbon composite in which fibrous carbon and carbon black are linked to each other is obtained, for example, by calcinating a mixture of fibrous carbon and carbon black. In addition, a mixture of the carbon composite thus obtained and the positive electrode active material can be prepared and calcinated, and the product thus obtained can also be used as the carbon composite.

With respect to the slurry for positive electrode of the present embodiment, the content of the afore-mentioned binder composition, the positive electrode active material, and the conductive assistant is not particularly limited. Here, from the viewpoint of enhancing the binding property and from the viewpoint of imparting good characteristics to the lithium ion secondary battery when such battery is manufactured, the contents are preferably in the following range.

The content of the afore-mentioned binder composition is preferably 1 to 20 mass %, more preferably 2 to 15 mass %, further more preferably 3 to 10 mass %, based on the solid content in the binder composition.

The content of the afore-mentioned positive electrode active material is preferably 50 to 95 mass %, more preferably 60 to 95 mass %, further more preferably 70 to 90 mass %.

The content of the afore-mentioned conductive assistant is preferably 1 to 10 mass %, and more preferably 3 to 7 mass %.

The content of the conductive assistant is preferably 1 to 10 parts by mass, more preferably 3 to 7 parts by mass, based on 100 parts by mass of the total amount of the binder, active material, and conductive assistant. By controlling the content of the conductive assistant to 1 part by mass or more, the high-speed charging characteristics and the high output characteristics of the lithium ion secondary battery can be improved. Further, by controlling the content to 10 parts by mass or less, a positive electrode with even higher density can be obtained. Accordingly, the charge/discharge capacity of the battery becomes superior.

<Positive Electrode>

The positive electrode according to the embodiment of the present invention is manufactured using the slurry for positive electrode described above. The positive electrode is preferably manufactured using a metal foil and the afore-mentioned slurry for positive electrode provided on the metal foil. The positive electrode is preferably for a lithium ion secondary battery electrode.

(Positive Electrode)

The positive electrode of the present embodiment is preferably manufactured by coating the metal foil with the afore-mentioned slurry for positive electrode, followed by drying. As the metal foil, aluminum in the form of foil is preferably used, and the thickness is preferably 5 to 30 μm from the viewpoint of workability.

(Manufacturing Method of Positive Electrode)

As a method for coating the slurry for positive electrode on the metal foil, a known method can be used. Examples of the method include a reverse roll method, a direct roll method, a blade method, a knife method, an extrusion method, a curtain method, a gravure method, a bar method, a dipping method, and a squeeze method. Among these, the blade method (comma roll or die cutting), the knife method and the extrusion method are preferable. Here, by selecting the coating method in accordance to the physical properties of the solution and to the drying properties of the binder, a good surface condition can be obtained with the coating layer. Coating may be applied to one side or both sides. When the coating is applied to both sides, application may be done with one side at a time or both sides simultaneously. The coating may be continuous, intermittent, or striped. The coating thickness, length, and width of the slurry for positive electrode may be determined arbitrarily depending on the size of the battery. For example, the coating thickness of the slurry for positive electrode, that is, the thickness of the positive electrode plate can be in the range of 10 μm to 500 μm.

As a method for drying the slurry for positive electrode, methods that are generally adopted can be used. In particular, hot wind, vacuum, infrared, far infrared, electron beam, and low temperature wind can be used alone or in combination.

The positive electrode can be pressed if necessary. As the pressing method, methods that are generally adopted can be used. Particularly, a die pressing method or a calendar pressing method (cold or hot roll) is preferable. The pressing pressure in the calendar pressing method is not particularly limited, and is preferably 0.2 to 3 ton/cm.

<Lithium Ion Secondary Battery>

The lithium ion secondary battery according to the embodiment of the present invention is manufactured using the afore-mentioned positive electrode and preferably includes the afore-mentioned positive electrode, a negative electrode, a separator, and an electrolyte solution (electrolyte and electrolytic solution).

(Negative Electrode)

The negative electrode used in the lithium ion secondary battery of the present embodiment is not particularly limited, and can be manufactured using a slurry for negative electrode containing a negative electrode active material. This negative electrode can be manufactured, for example, by using a negative electrode metal foil and a slurry for negative electrode provided on the metal foil. The slurry for negative electrode preferably contains a negative electrode binder, a negative electrode active material, and the afore-mentioned conductive assistant. The negative electrode binder is not particularly limited. Here, for example, polyvinylidene fluoride, polytetrafluoroethylene, styrene-butadiene copolymer, acrylic copolymer and the like can be used. As the negative electrode binder, fluororesin is preferable, polyvinylidene fluoride and polytetrafluoroethylene are more preferable, and polyvinylidene fluoride is further more preferable.

Examples of the negative electrode active material used for the negative electrode include carbon materials such as graphite, polyacene, carbon nanotube and carbon nanofiber, alloy materials such as tin alloy and silicon alloy, and oxide materials such as tin oxide, silicon oxide, lithium titanate, and the like. These negative electrode active materials can be used alone, or two or more of these can be used in combination.

As the metal foil for the negative electrode, copper in the form of foil is preferably used, and the thickness is preferably 5 to 30 µm from the viewpoint of processability. The negative electrode can be manufactured by using a slurry for negative electrode and a negative electrode metal foil in accordance with a method similar to the manufacturing method of the afore-mentioned positive electrode.

(Separator)

Regarding a separator, any separator may be used so long as it has sufficient strength, such as electrically insulating porous membrane, net, nonwoven fabric and the like. In particular, it is preferable to use a separator having low resistance to ion migration of the electrolytic solution and excellent solution retention. Material of the separator is not particularly limited, and inorganic fibers such as glass fibers, organic fibers, synthetic resins such as polyethylene, polypropylene, polyester, polytetrafluoroethylene, polyflon, etc., or layered composites thereof can be mentioned as an example. From the viewpoints of adhesive property and safety, polyethylene, polypropylene and the layered composite film thereof is preferable.

(Electrolyte)

As the electrolyte, any conventionally known lithium salts can be used, and examples thereof include $LiClO_4$, $LiBF_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiI$, $LiB(C_2H_5)_4$, $LiCF_3SO_3$, $LiCH_3SO_3$, $LiCF_3SO_3$, $LiC_4F_9SO_3$, $LiN(CF_3SO_2)_2$, $LiN(C_2F_6SO_2)_2$, $LiC(CF_3SO_2)_3$, lower fatty acid lithium carboxylate and the like.

(Electrolytic Solution)

The electrolytic solution for dissolving the electrolyte is not particularly limited. As the electrolytic solution, for example, carbonates such as propylene carbonate, ethylene carbonate, dimethyl carbonate, diethyl carbonate and methyl ethyl carbonate, lactones such as γ-butyrolactone, ethers such as trimethoxymethane, 1,2-dimethoxyethane, diethyl ether, 2-ethoxyethane, tetrahydrofuran and 2-methyltetrahydrofuran, sulfoxides such as dimethylsulfoxide, oxolanes such as 1,3-dioxolane and 4-methyl-1,3-dioxolane, nitrogen-containing compounds such as acetonitrile, nitromethane and N-methyl-2-pyrrolidone, esters such as methyl formate, methyl acetate, ethyl acetate, butyl acetate, methyl propionate, ethyl propionate and phosphoric acid triester, ionorganic acid esters such as sulfuric acid esters, nitric acid esters, and hydrochloric acid esters, amides such as dimethylformamide and dimethylacetamide, glymes such as diglyme, triglyme and tetraglyme, ketones such as acetone, diethyl ketone, methyl ethyl ketone and methyl isobutyl ketone, sulfolanes such as sulfolane, oxazolidinones such as 3-methyl-2-oxazolidinone, and sultones such as 1,3-propanesultone, 4-butanesultone and naphthasultone can be mentioned. One or more of these electrolytic solutions can be selected for usage.

Among the afore-mentioned electrolyte and electrolytic solution, an electrolyte solution in which $LiPF_6$ is dissolved in carbonates is preferable, and the concentration of the electrolyte in the solution varies depending on the electrode and electrolytic solution used. Here, the concentration is preferably 0.5 to 3 mol/L.

EXAMPLES

Hereinafter, the present invention will be described more specifically referring to examples and comparative examples. Here, the present invention shall not be limited to these.

Example 1

(Preparation of PVA)

Vinyl acetate (600 parts by mass) and methanol (400 parts by mass) were stocked, followed by deoxygenation by bubbling nitrogen gas. Subsequently, bis(4-t-butylcyclohexyl)peroxydicarbonate (0.3 parts by mass) as a polymerization initiator was stocked, and polymerization was carried out at 60° C. for 4 hours. The solid content concentration of the polymerization solution at the time of termination of the polymerization was 48%, and the polymerization rate of vinyl acetate determined from the solid content was 80%. Methanol vapor was blown into the obtained polymerization solution to remove unreacted vinyl acetate and then the resultant solution was diluted with methanol so that the concentration of polyvinyl acetate was 40 mass %.

To the diluted polyvinyl acetate solution (1200 parts by mass), 10 mass % methanol solution of sodium hydroxide (20 parts by mass) was added. Saponification reaction was carried out at 30° C. for 2 hours.

The solution after saponification was neutralized with acetic acid, filtered and dried at 100° C. for 2 hours to give PVA. The average degree of polymerization of the obtained PVA was 330 and the saponification degree was 96.3 mol %.

<Saponification Degree>

The average degree of polymerization and the saponification degree of PVA was measured in accordance with the method provided in JIS K 6726.

(Preparation of Binder A)

Hereinafter, the preparation method of binder A is described. In this embodiment, the binder means a graft copolymer according to the present invention.

PVA obtained (1.65 parts by mass) was added to dimethylsulfoxide (265.1 parts by mass), and was allowed to dissolve by stirring at 60° C. for 2 hours.

Subsequently, ammonium peroxodisulfate (0.03 parts by mass) dissolved in acrylonitrile (30.3 parts by mass) and dimethylsulfoxide (3 parts by mass) were added at 60° C., followed by copolymerization with agitation at 60° C. Four hours after the initiation of polymerization, the polymerization was terminated by cooling the reaction mixture to room temperature.

(Precipitation and Drying)

The reaction solution containing the obtained binder A (297 parts by mass) was added dropwise to methanol (2970 parts by mass) to precipitate binder A. The polymer was separated by filtration, vacuum dried for 2 hours at room temperature, and further vacuum dried at 80° C. for 2 hours. The solid content was 8.87 mass %, and the polymerization rate of acrylonitrile was 23.8% when calculated from the solid content.

The mass of PAN in the obtained binder A was 76.2% by mass of the total polymer, the graft rate was 355%, and the mass average molecular weight of the PAN homopolymer was 256200. Measurement methods of these values will be described in the following <Composition Ratio>, <Graft Rate> and <Mass Average Molecular Weight>.

<Composition Ratio>

Composition ratio of binder A was calculated from the reaction rate (polymerization rate) of acrylonitrile and the composition of each of the stocked component used for polymerization. The mass % of PAN formed at the time of copolymerization (mass % of PAN in the graft copolymer) was calculated from the polymerization rate (%) of acrylonitrile, mass of acrylonitrile used for graft copolymerization (amount stocked), and mass of PVA used for graft copolymerization (amount stocked), using the afore-mentioned formula (2). Here, the "mass ratio" in the following table is the mass ratio in the resin component including the graft copolymer itself, and the PVA homopolymer and the PAN homopolymer formed during the copolymerization.

<Graft Rate>

Binder A (1.00 g) was precisely weighed and added to special grade DMF (50 cc, manufactured by KOKUSAN CHEMICAL Co., Ltd.), and the mixture was stirred at 80° C. for 24 hours. Subsequently, the mixture was centrifuged at 10000 rpm for 30 minutes with a centrifugal separator (model: H2000B, rotor: H, manufactured by KOKUSAN Co. Ltd.). After carefully separating the filtrate (DMF soluble matter), the matter insoluble in the pure water was vacuum dried at 100° C. for 24 hours. The graft rate was calculated using formula (1) described above.

<Mass Average Molecular Weight>

The filtrate (DMF soluble matter) obtained after centrifugation was poured into methanol (1000 ml) to give a precipitate. The precipitate was vacuum dried at 80° C. for 24 hours, and mass average molecular weight expressed in terms of standard polystyrene was measured by GPC. GPC measurement was carried out under the following conditions.

Column: two columns (GPC LF-804, φ8.0×300 mm, manufactured by Showa Denko K. K.) were connected in series and used Column temperature: 40° C.

Solvent: 20 mM-LiBr/DMF

<Oxidative Degradation Potential>

Binder A (10 parts by mass) was dissolved in N-methylpyrrolidone (90 parts by mass) to obtain a polymer solution. Subsequently, acetylene black (1 part by mass, Denka Black (registered trademark) "HS-100" manufactured by Denka Company Limited) was added to the obtained polymer solution (100 parts by mass), and the mixture was stirred. The obtained solution was coated on an aluminum foil so as to provide a dry thickness of 20 μm, preliminarily dried at 80° C. for 10 minutes, and then dried at 105° C. for 1 hour to give a test piece.

The obtained test piece was used as the working electrode, lithium was used as the counter electrode and reference electrode, and a solution of ethylene carbonate/diethyl carbonate (=1/2 (volume ratio), concentration of 1 mol/L) in which $LiPF_6$ was used as an electrolyte salt was used as the electrolytic solution, thereby assembling a three-pole cell (manufactured by TOYO SYSTEM CO., LTD.). Linear sweep voltammetry (hereinafter abbreviated as LSV) was performed at 25° C. with a scanning speed of 10 mV/sec using a Potentiostat/Galvanostat (1287 type, manufactured by Solartron Analytical). The oxidative degradation potential was defined as the potential when the current reached 0.1 $mA/cm^2$. The higher the oxidative degradation potential, the more difficult for the oxidative degradation to occur, and thus it can be considered that oxidation resistance is high.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| binder |  | A | B | C | D | E | F | G | H | I |
| polymerization degree of PVA |  | 330 | 1650 | 2940 | 1440 | 1650 | 1730 | 1420 | 1680 | 1550 |
| saponification degree of PVA |  | 96.3 | 95.5 | 94.8 | 91.2 | 99.9 | 95.8 | 94.6 | 95.8 | 94.6 |
| mass ratio | PVA | 23.8 | 19 | 21 | 23 | 22 | 11 | 38 | 28 | 20 |
| (%) | PAN | 76.2 | 81 | 79 | 77 | 78 | 89 | 62 | 72 | 80 |
| graft rate (%) |  | 355 | 426 | 376 | 335 | 355 | 809 | 163 | 257 | 400 |
| mass average molecular weight of PAN homopolymer |  | 256200 | 231100 | 253800 | 223900 | 221600 | 215600 | 234400 | 215500 | 214600 |
| oxidative degradation potential (V) |  | 75 | 7.4 | 7.6 | 7.4 | 7.5 | 7.8 | 7.1 | 7.2 | 7.5 |

Example 2

The amount of bis (4-t-butylcyclohexyl) peroxydicarbonate in Example 1 was altered to 0.15 parts by mass, and polymerization was carried out at 60° C. for 5 hours. The polymerization rate was 80%. Unreacted vinyl acetate was removed in a similar manner as in Example 1, and then the resultant solution was diluted with methanol so that the concentration of polyvinyl acetate would be 30 mass %. To this polyvinyl acetate solution (2000 parts by mass), methanol solution of sodium hydroxide (concentration of 10 mass %, 20 parts by mass) was added, followed by saponification reaction at 30° C. for 2.5 hours.

Neutralization, filtration and drying were carried out in a similar manner as in Example 1 to give PVA having an average degree of polymerization of 1650 and a saponification degree of 95.5 mol %.

Polymerization of PAN was carried out in a similar manner as in Example 1 using the obtained PVA to prepare binder B. The mass ratio of PVA and PAN in binder B was 19:81, the graft rate was 426%, and the average molecular weight of PAN homopolymer was 231100. Composition ratio, graft rate, and mass average molecular weight of the PAN homopolymer were measured in a similar manner as in Example 1. The same applies to the following Examples 3 to 9.

Example 3

The amount of vinyl acetate in Example 1 was altered to 900 parts by mass, the amount of polymerization initiator bis (4-t-butylcyclohexyl) peroxydicarbonate in Example 1 was altered to 0.15 parts by mass, and polymerization was carried out at 60° C. for 5 hours. The polymerization rate was 70%. Dilution with methanol was conducted so that the concentration of polyvinyl acetate would be 30 mass %. To this polyvinyl acetate solution (2000 parts by mass), methanol solution of sodium hydroxide (concentration of 10 mass %, 20 parts by mass) was added, followed by saponification reaction at 30° C. for 2.5 hours. Neutralization, filtration and drying were carried out in a similar manner as in Example 1 to give PVA having an average degree of polymerization of 2940 and a saponification degree of 94.8 mol %.

Polymerization of PAN was carried out in a similar manner as in Example 1 using the obtained PVA to prepare binder C. The mass ratio of PVA and PAN in binder C was 21:79, the graft rate was 376%, and the average molecular weight of PAN homopolymer was 253800.

Example 4

The amount of vinyl acetate in Example 1 was altered to 550 parts by mass, the amount of polymerization initiator bis (4-t-butylcyclohexyl) peroxydicarbonate in Example 1 was altered to 0.15 parts by mass, and polymerization was carried out at 60° C. for 5 hours. The polymerization rate was 75%. Dilution with methanol was conducted so that the concentration of polyvinyl acetate would be 30 mass %. To this polyvinyl acetate solution (2000 parts by mass), methanol solution of sodium hydroxide (concentration of 10 mass %, 20 parts by mass) was added, followed by saponification reaction at 30° C. for 2 hours. Neutralization, filtration and drying were carried out in a similar manner as in Example 1 to give PVA having an average degree of polymerization of 1440 and a saponification degree of 91.2 mol %. Polymerization of PAN was carried out in a similar manner as in Example 1 using the obtained PVA to prepare binder D. The mass ratio of PVA and PAN in binder D was 23:77, the graft rate was 335%, and the average molecular weight of PAN homopolymer was 223900.

Example 5

The saponification reaction as in Example 2 was performed at 30° C. for 5 hours, and the rest of the conditions were carried out in a similar manner as in Example 2 to prepare binder E. The PVA obtained had an average degree of polymerization of 1650 and a saponification degree of 99.9%. The mass ratio of PVA and PAN in binder E was 22:78, the graft rate was 355%, and the average molecular weight of PAN homopolymer was 221600.

Example 6

The polymerization reaction of polyvinyl acetate as in Example 2 was performed for 6 hours, and the rest of the conditions were carried out in a similar manner as in Example 2 to prepare PVA. The PVA obtained had an average degree of polymerization of 1730 and a saponification degree of 95.8%. Preparation of binder F was carried out by altering the amount of PVA to 1 parts by mass, and the rest of the conditions were carried out in a similar manner as in Example 1. The mass ratio of PVA and PAN in binder F was 11:89, the graft rate was 809%, and the mass average molecular weight of PAN homopolymer was 215600.

Example 7

The amount of vinyl acetate in Example 2 was altered to 500 parts by mass, the duration of polymerization was altered to 4 hours, and the rest of the conditions were carried out in a similar manner as in Example 2 to prepare PVA. The PVA obtained had an average degree of polymerization of 1420 and a saponification degree of 94.6%. The PVA thus obtained was used to prepare binder G. Preparation of binder G was carried out by altering the amount of PVA in Example 1 to 2.5 parts by mass, and the rest of the conditions were carried out in a similar manner as in Example 1. The mass ratio of PVA and PAN in binder G thus obtained was 38:62, the graft rate was 163%, and the mass average molecular weight of PAN homopolymer was 234400.

Example 8

Preparation of PVA was carried out in a similar manner as in Example 2. The PVA obtained had an average degree of polymerization of 1680 and a saponification degree of 95.8%. The PVA thus obtained was used to prepare binder H. Preparation of binder H was carried out by altering the amount of PVA in Example 1 to 2.0 parts by mass, and the rest of the conditions were carried out in a similar manner as in Example 1. The mass ratio of PVA and PAN in binder H thus obtained was 28:72, the graft rate was 257%, and the mass average molecular weight of PAN homopolymer was 215500.

Example 9

The amount of vinyl acetate in Example 2 was altered to 550 parts by mass, the duration of reaction was altered to 6 hours, and the rest of the conditions were carried out in a similar manner as in Example 2 to prepare PVA. The PVA obtained had an average degree of polymerization of 1550 and a saponification degree of 94.6%. The PVA thus obtained was used to prepare binder I. Preparation of binder I was carried out in a similar manner as in Example 1. The mass ratio of PVA and PAN in binder I thus obtained was 20:80, the graft rate was 400%, and the mass average molecular weight of PAN homopolymer was 214600.

Comparative Example 1

The amount of vinyl acetate stocked during polyvinyl acetate preparation in Example 1 was altered to 500 parts by mass, the amount of methanol was altered to 500 parts by mass, the amount of bis (4-t-butylcyclohexyl) peroxydicarbonate was altered to 0.3 parts by mass, and the rest of the conditions were carried out in a similar manner as in Example 1 to prepare PVA having an average degree of polymerization of 290 and a saponification degree of 91 mol %. Preparation of binder J was carried out in a similar manner as in Example 1, except that the amount of PVA in Example 1 was altered to 3.2 parts by mass.

The mass ratio of PVA and PAN in binder J thus obtained was 42:58, the graft rate was 138%, and the mass average molecular weight of PAN homopolymer was 222100.

Comparative Example 2

The amount of vinyl acetate stocked during polyvinyl acetate preparation in Example 1 was altered to 3000 parts by mass, the amount of methanol was altered to 500 parts by mass, the amount of bis (4-t-butylcyclohexyl) peroxydicarbonate was altered to 0.15 parts by mass, the duration of the reaction was altered to 12 hours, the duration of saponification was altered to 2 hours, and the rest of the conditions were carried out in a similar manner as in Example 1 to prepare PVA having an average degree of polymerization of 3640 and a saponification degree of 93 mol %.

Preparation of binder K was carried out in a similar manner as in Example 1, except that the amount of PVA in Example 1 was altered to 3.2 parts by mass. The mass ratio of PVA and PAN in binder K thus obtained was 45:55, the graft rate was 122%, and the mass average molecular weight of PAN homopolymer was 212500.

Comparative Example 3

The amount of vinyl acetate stocked during polyvinyl acetate preparation in Example 1 was altered to 1200 parts by mass, the duration of the reaction was altered to 6 hours, the duration of saponification was altered to 1 hour, and the rest of the conditions were carried out in a similar manner as in Example 1 to prepare PVA having an average degree of polymerization of 630 and a saponification degree of 82 mol %.

Preparation of binder L was carried out in a similar manner as in Example 1, except that the amount of PVA in Example 1 was altered to 6.2 parts by mass, and the duration of reaction was altered to 10 hours. The mass ratio of PVA and PAN in binder L thus obtained was 82:18, the graft rate was 22%, and the mass average molecular weight of PAN homopolymer was 204300.

Comparative Example 4

The amount of vinyl acetate stocked during polyvinyl acetate preparation in Example 1 was altered to 1800 parts by mass, the duration of the reaction was altered to 12 hours, the duration of saponification was altered to 0.5 hour, and the rest of the conditions were carried out in a similar manner as in Example 1 to prepare PVA having an average degree of polymerization of 1710 and a saponification degree of 63 mol %.

Preparation of binder M was carried out in a similar manner as in Example 1, except that the amount of PVA in Example 1 was altered to 6.5 parts by mass. The mass ratio of PVA and PAN in binder M thus obtained was 86:14, the graft rate was 16%, and the mass average molecular weight of PAN homopolymer was 212400.

Comparative Example 5

The amount of vinyl acetate stocked during polyvinyl acetate preparation in Example 1 was altered to 2400 parts by mass, the duration of the reaction was altered to 10 hours, the duration of saponification was altered to 1 hour, and the rest of the conditions were carried out in a similar manner as in Example 1 to prepare PVA having an average degree of polymerization of 2490 and a saponification degree of 82 mol %.

Preparation of binder N was carried out in a similar manner as in Example 1, except that the amount of PVA in Example 1 was altered to 0.6 parts by mass. The mass ratio of PVA and PAN in binder N thus obtained was 8:92, the graft rate was 1150%, and the mass average molecular weight of PAN homopolymer was 213100.

Comparative Example 6

The amount of vinyl acetate stocked during polyvinyl acetate preparation in Example 1 was altered to 3000 parts by mass, the amount of bis (4-t-butylcyclohexyl) peroxydicarbonate was altered to 0.15 parts by mass, the duration of the reaction was altered to 12 hours, the duration of saponification was altered to 2 hours, and the rest of the conditions were carried out in a similar manner as in Example 1 to prepare PVA having an average degree of polymerization of 3380 and a saponification degree of 93 mol %.

Preparation of binder P was carried out in a similar manner as in Example 1, except that the amount of PVA in Example 1 was altered to 3.7 parts by mass. The mass ratio of PVA and PAN in binder P thus obtained was 49:51, the graft rate was 104%, and the mass average molecular weight of PAN homopolymer was 228900.

Comparative Example 7

The amount of vinyl acetate stocked during polyvinyl acetate preparation in Example 1 was altered to 3000 parts by mass, the amount of bis (4-t-butylcyclohexyl) peroxydicarbonate was altered to 0.15 parts by mass, the duration of the reaction was altered to 12 hours, the duration of saponification was altered to 2 hours, and the rest of the conditions were carried out in a similar manner as in Example 1 to prepare PVA having an average degree of polymerization of 3510 and a saponification degree of 95 mol %.

Preparation of binder Q was carried out in a similar manner as in Example 1, except that the amount of PVA in Example 1 was altered to 0.5 parts by mass. The mass ratio of PVA and PAN in binder Q thus obtained was 7:93, the graft rate was 1329%, and the mass average molecular weight of PAN homopolymer was 212300.

Comparative Example 8

Polyvinylidene fluoride ("KF Polymer (registered trademark) #1120" manufactured by KUREHA CORPORATION) was used as binder S.

TABLE 2

| | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| binder | J | K | L | M | N | P | Q | S |
| polymerization degree of PVA | 290 | 3640 | 630 | 1710 | 2490 | 3380 | 3510 | |
| saponification degree of PVA | 91 | 93 | 82 | 63 | 82 | 93 | 95 | |
| mass ratio (%) PVA | 42 | 45 | 82 | 86 | 8 | 49 | 7 | |
| mass ratio (%) PAN | 58 | 55 | 18 | 14 | 92 | 51 | 93 | |
| mass ratio (%) PVDF | | | | | | | | 100 |
| graft rate (%) | 138 | 122 | 22 | 16 | 1150 | 104 | 1329 | |
| mass average molecular weight of PAN homopolymer | 222100 | 212500 | 204300 | 212400 | 213100 | 228900 | 212300 | |
| oxidative degradation potential (V) | 6.9 | 6.5 | 6.2 | 6.3 | 7.0 | 6.2 | 7.0 | 6.1 |

Example 10

Binder A was used to prepare a slurry for positive electrode in accordance with the following procedure. Peel strength of the slurry for positive electrode was measured. Further, positive electrode and lithium ion secondary battery were made using the slurry for positive electrode, and the peel strength, discharge rate characteristics, cycle characteristics, and OCV retention rate of the electrode were evaluated. Results are shown in Table 3.

When the elution amount of Mn and Ni to the negative electrode was measured in accordance with the procedure described below, elution amount of Mn and Ni were 82.1 ppm and 12.2 ppm, respectively. Since the elution amount was suppressed, OCV retention rate showed high value.

C. for 1 hour to give a positive electrode plate. The obtained positive electrode plate was pressed with a roll press machine at a linear pressure of 0.2 to 3.0 ton/cm, and adjustment was made so that the average thickness of the positive electrode plate would be 75 μm. The obtained positive electrode plate was cut into a width of 1.5 cm, and an adhesive tape was attached to a surface at the positive electrode active material side. Subsequently, a stainless steel plate and the tape attached to the positive electrode plate were laminated using a double-sided tape. Further, an adhesive tape was attached on the aluminum foil to prepare a test piece. The stress when the adhesive tape attached with the aluminum foil was peeled off at 23° C. and relative humidity of 50%, with a peeling direction of 180° and a peeling speed

TABLE 3

| | | | Example 10 | Example 11 | Example 12 | Example 13 | Example 14 | Comparative Example 9 | Comparative Example 10 | Comparative Example 11 |
|---|---|---|---|---|---|---|---|---|---|---|
| binder composition | binder | binder | A | C | D | E | A | J | N | S |
| | | amount of binder | 7 | 7 | 7 | 7 | 7 | 7 | 7 | 7 |
| | active material | LiNi$_{0.5}$Mn$_{1.5}$O$_4$ | 87.42 | 87.42 | 87.42 | 87.42 | 87.4.2 | 87.42 | 87.42 | 87.42 |
| | conductive aid | acetylene black | 3.72 | 3.72 | 3.72 | 3.72 | 5.58 | 3.72 | 3.72 | 3.72 |
| | | carbon nano fiber | 1.86 | 1.86 | 1.86 | 1.86 | | 1.86 | 1.86 | 1.86 |
| evaluation | peel strength (mN/mm) | | 188 | 190 | 188 | 191 | 195 | 200 | 120 | 20 |
| | high rate discharge capacity retention rate (%) | | 88 | 87 | 89 | 89 | 86 | 86 | 87 | 82 |
| | cycle capacity retention rate (%) | | 89 | 90 | 89 | 89 | 88 | 85 | 83 | 80 |
| | OCV retention rate (%) | | 93 | 93 | 94 | 92 | 92 | 44 | 70 | 0 |
| | elution amount (ppm) | Mn | 82.1 | 78.3 | 75.1 | 74.8 | 75.2 | 184.7 | 77.7 | 288.1 |
| | | Ni | 12.2 | 13.3 | 12.1 | 11.2 | 11.5 | 56.5 | 10.5 | 105.3 |

(Preparation of Slurry for Positive Electrode)

Binder A obtained (7 parts by mass) was dissolved in N-methylpyrrolidone (92 parts by mass, hereinafter abbreviated as NMP) to give a binder solution. Further, acetylene black (3.72 parts by mass, Denka Black (registered trademark) "HS-100" manufactured by Denka Company Limited), NMP dispersion of carbon nanofiber "Flotube 9000" (1.86 parts by mass by solids, manufactured by CNano Technology, Ltd.) as a fibrous carbon, and the binder solution (8 parts by mass by solids) were mixed by agitation. After mixing, LiNi$_{0.5}$Mn$_{1.5}$O$_4$ (87.42 parts by mass) was added and the mixture was further mixed by agitation to give a slurry for positive electrode.

<Binding Property (Peel Strength)>

The obtained slurry for positive electrode was applied on an aluminum foil so that the film thickness after drying would be 100±5 μm, followed by preliminary drying at 80° C. for 10 minutes. Subsequently, the slurry was dried at 105° of 50 mm/min was measured. This measurement was repeated 5 times to obtain an average value, and was taken as peel strength.

(Preparation of Positive Electrode)

The positive electrode material slurry thus prepared was coated on both sides of the 20 μm thick aluminum foil using an automatic coating machine by an amount of 140 g/m², followed by preliminarily drying at 80° C. for 10 minutes. Subsequently, pressing was performed with a roll press machine at a linear pressure of 0.2 to 3 ton/cm, and the thickness of the positive electrode plates were adjusted to have 148 μm including both sides. Further, the positive electrode plate was cut by a width of 54 mm to prepare a rectangular positive electrode plate. Aluminum current collector tab was ultrasonically welded to the end portion of the positive electrode plate, followed by drying at 105° C. for 1 hour in order to completely remove volatile components such as residual solvent and adsorbed moisture, thereby giving a positive electrode.

(Preparation of Negative Electrode)

Graphite (96.6 parts by mass, "CARBOTRON (registered trademark) P", manufactured by KUREHA CORPORATION) as a negative electrode active material, polyvinylidene fluoride (3.4 parts by mass in terms of solids, "KF Polymer (registered trademark) #1120", manufactured by KUREHA CORPORATION) as a binder, and NMP (appropriate amount so that the total solids would be 50 mass %) were added and mixed by agitation, thereby giving a slurry for negative electrode.

Onto both sides of a copper foil having a thickness of 10 μm, the negative electrode material slurry thus obtained was coated using an automatic coating machine by an amount of 70 g/m$^2$, followed by preliminarily drying at 80° C. for 10 minutes. Subsequently, pressing was performed with a roll press machine at a linear pressure of 0.2 to 3 ton/cm, and the thickness of the negative electrode plates were adjusted to have 90 μm including both sides. Further, the negative electrode plate was cut by a width of 54 mm to prepare a rectangular negative electrode plate. Nickel current collector tab was ultrasonically welded to the end portion of the negative electrode plate, followed by drying at 105° C. for 1 hour in order to completely remove volatile components such as residual solvent and adsorbed moisture, thereby giving a negative electrode.

(Preparation of Battery)

The positive electrode and the negative electrode thus obtained were combined and wound by placing in between a polyethylene microporous membrane separator having a thickness of 25 μm and a width of 60 mm, thereby providing a spiral wound body, and then the wound body was inserted into a battery can. Subsequently, a nonaqueous electrolytic solution (5 ml, ethylene carbonate/methylethyl carbonate=30/70 (mass ratio) mixture) in which LiPF$_6$ as an electrolyte was dissolved to have 1 mol/L concentration was injected into a battery container. Then the inlet was caulked and sealed, thereby obtaining a cylindrical lithium secondary battery having a diameter of 18 mm and a height of 65 mm. Performance of the lithium ion secondary battery thus obtained was evaluated in accordance with the procedure described below.

<Discharge Rate Characteristics (High Rate Discharge Capacity Retention Rate)>

The lithium ion secondary battery prepared was subjected to charging with constant current constant voltage charging profile (limited to 5.00±0.02 V and 0.2 ItA) at 25° C., and then the battery was discharged at a constant current of 0.2 ItA to 3.00±0.02 V. Subsequently, the discharge current was changed to 0.2 ItA and 1 ItA, and the discharge capacity with respect to each discharge current was measured. The recovery charge in each measurement was conducted with constant current constant voltage charging profile (5.00±0.02 V (1 ItA cut)). The high rate discharge capacity retention rate was calculated as the rate of capacity measured in 1 ItA discharge for the capacity measured in the second 0.2 ItA discharge.

<Cycle Characteristics (Cycle Capacity Retention Rate)>

At an environmental temperature of 25° C., charging with constant current constant voltage charging profile (charging voltage of 5.00±0.02 V, 1 ItA) and discharging with constant current (discharge terminating voltage of 3.00±0.02 V, 1 ItA) was performed. Cycles of charging and discharging were repeated, and the rate of the discharge capacity measured in the 500th cycle to the discharge capacity measured in the 1$^{st}$ cycle was calculated as the cycle capacity retention rate.

<Storage Characteristics (OCV Retention Rate)>

A fully charged lithium ion secondary battery (5.00±0.02 V) was stored in a thermostatic chamber of 60° C., and the battery voltage at 60° C. was measured after 96 hours. From the results obtained, voltage retention rate (OCV retention rate) was obtained using the following formula (3).

$$OCV \text{ retention rate=battery voltage after storage/battery voltage before storage} \times 100(\%) \quad (3)$$

<Elution Amount of Mn, Ni>

The lithium ion secondary battery used in the aforementioned evaluation of storage characteristics after storage at 60° C. for 96 hours was disassembled. The amount of Mn and Ni detected with the negative electrode was determined by Inductively Coupled Plasma-Atomic Emission Spectrometry (ICP-AES). Here, the amount of Mn detected from the negative electrode was considered to have eluted from the positive electrode active material to the negative electrode during the storage.

Preparation of ICP-AES samples were conducted in the following manner. The coin battery after storage at 60° C. for 96 hours was disassembled in an argon-atmosphere glove box, and the negative electrode was taken out. The negative electrode thus taken out was immersed in aqueous hydrochloric acid (0.2N, 100 ml) at 100° C. for 10 minutes, thereby allowing dissolution of Mn and Ni deposited at the negative electrode. Subsequently, the negative electrode was removed by filtration, and the filtrate was diluted in a measuring flask to give the ICP-EAS sample.

Here, the elution amount of Mn and Ni to the negative electrode is calculated as follows.

$$\text{Elution amount of Mn or Ni=mass of Mn or Ni/mass of negative electrode} \quad (4)$$

Examples 11 to 14

Binder A in Example 1 was altered to the binders shown in Table 3. The rest of the procedures were carried out in a similar manner as in Example 10, to conduct each of the evaluations. The results are shown in Table 3.

Comparative Example 9

Slurry for positive electrode, positive electrode, negative electrode, and lithium ion secondary battery were prepared in a similar manner as in Example 10, except that LiNi$_{0.5}$Mn$_{1.5}$O$_4$ was used as the active material, and binder J was used as the binder. Elution amount of Mn or Ni was evaluated.

Here, with respect to the high rate discharge capacity retention rate and the cycle capacity retention rate, evaluation was carried out with a charging voltage of 5.00±0.02 V and a discharging voltage of 3.00±0.02 V. As a result, the high rate discharge capacity retention rate was 86%, the cycle capacity retention rate was 85%, and the OCV retention rate after 96 hours storage at 60° C. was 44%. Further, the elution amount of Mn to the negative electrode was 184.7 ppm, and the elution amount of Ni was 56.5 ppm. As a result of such increase in the elution amount, the OCV retention rate showed low value.

Comparative Example 10

Slurry for positive electrode, positive electrode, negative electrode, and lithium ion secondary battery were prepared in a similar manner as in Example 10, except that LiNi$_{0.5}$Mn$_{1.5}$O$_4$ was used as the active material, and binder N was used as the binder. Elution amount of Mn or Ni was evaluated.

Here, with respect to the high rate discharge capacity retention rate and the cycle capacity retention rate, evaluation was carried out with a charging voltage of 5.00±0.02 V and a discharging voltage of 3.00±0.02 V. As a result, the high rate discharge capacity retention rate was 87%, the cycle capacity retention rate was 83%.

The OCV retention rate after 120 hours storage at 60° C. was 70%. Further, the elution amount of Mn to the negative electrode was 77.7 ppm, and the elution amount of Ni was 10.5 ppm. As a result of such decrease in the elution amount, the OCV retention rate showed high value.

Comparative Example 11

Slurry for positive electrode, positive electrode, negative electrode, and lithium ion secondary battery were prepared in a similar manner as in Example 10, except that LiNi$_{0.5}$Mn$_{1.5}$O$_4$ was used as the active material, and binder S was used as the binder. Elution amount of Mn or Ni was evaluated.

Here, with respect to the high rate discharge capacity retention rate and the cycle capacity retention rate, evaluation was carried out with a charging voltage of 5.00±0.02 V and a discharging voltage of 3.00±0.02 V. As a result, the high rate discharge capacity retention rate was 82%, the cycle capacity retention rate was 80%.

The OCV retention rate after 120 hours storage at 60° C. was 0%. Further, the elution amount of Mn to the negative electrode was 288.1 ppm, and the elution amount of Ni was 105.3 ppm. As a result of such increase in the elution amount, the OCV retention rate showed low value.

From the results shown in Table 3, the lithium ion secondary battery manufactured using the binder composition of the present invention showed superior binding property, cycle characteristics, and discharge rate characteristics. In addition, since both of the elution amount of Mn and Ni from the positive electrode active material to the negative electrode were 100 ppm or less when the fully charged battery was stored at 60° C. for 96 hours, the OCV retention rate after storage was kept at 90% or higher.

The invention claimed is:

1. A binder composition for positive electrode comprising a graft copolymer obtained by graft copolymerizing, with polyvinyl alcohol, a monomer containing acrylonitrile as a main component; wherein:

the polyvinyl alcohol has an average degree of polymerization of 300 to 3000;
the polyvinyl alcohol has a saponification degree of 90 to 100 mol %;
the graft copolymer has a polyvinyl alcohol amount of 10 to 38 mass %; and
the graft copolymer has a polyacrylonitrile amount of 90 to 60 mass %.

2. The binder composition for positive electrode of claim 1, wherein:

the graft copolymer has a graft rate of 150 to 900%; and
a homopolymer of polyacrylonitrile generated during the graft copolymerization has a mass average molecular weight of 30000 to 250000.

3. A slurry for positive electrode; comprising:

the binder composition for positive electrode of claim 1;
a positive electrode active material; and
a conductive assistant.

4. The slurry for positive electrode of claim 3; wherein a solid content of the binder composition for positive electrode with respect to a total solids of the slurry for positive electrode is 1 to 20 mass %.

5. The slurry for positive electrode of claim 3; wherein the positive electrode active material comprises at least one selected from the group consisting of: LiNiXMn(2-X)O4 (wherein 0<X<2) and Li(CoXNiYMnZ)O2 (wherein 0<X<1, 0<Y<1, 0<Z<1, and X+Y+Z=1).

6. The slurry for positive electrode of claim 3; wherein the conductive assistant comprises at least one selected from the group consisting of: (i) fibrous carbon, (ii) carbon black, and (iii) carbon composite in which fibrous carbon and carbon black are linked to each other.

7. A positive electrode, comprising:

a metal foil; and
a coating comprising the binder composition for positive electrode of claim 1; a positive electrode active material; and a conductive assistant; the coating being formed on the metal foil.

8. A lithium ion secondary battery comprising the positive electrode of claim 7.

9. The lithium ion secondary battery of claim 8, wherein both of an elution amount of Mn and Ni from the positive electrode active material to a negative electrode when the battery was fully charged and then stored at 60° C. for 96 hours are 100 ppm or less.

* * * * *